United States Patent
Belkhoudja et al.

(10) Patent No.: US 9,139,145 B2
(45) Date of Patent: Sep. 22, 2015

(54) COMBINED WIRED AND WIRELESS REMOTE CONTROL FOR "HANDS-FREE" MULTIMEDIA AND TELEPHONY EQUIPMENT OF A MOTOR VEHICLE

(71) Applicant: PARROT, Paris (FR)

(72) Inventors: Hocine Belkhoudja, Paris (FR); Flavien Morra, Pantin (FR); Jean-Francois Vuillet, Versailles (FR)

(73) Assignee: PARROT, Paris (FR)

( * ) Notice: Subject to any disclaimer, the term of this patent is extended or adjusted under 35 U.S.C. 154(b) by 505 days.

(21) Appl. No.: 13/687,848

(22) Filed: Nov. 28, 2012

(65) Prior Publication Data

US 2013/0147265 A1    Jun. 13, 2013

(30) Foreign Application Priority Data

Dec. 8, 2011    (FR) ...................................... 11 61310

(51) Int. Cl.
  *B60L 1/00*  (2006.01)
  *B60R 16/03*  (2006.01)
  *B60R 11/02*  (2006.01)
  *H04M 1/60*  (2006.01)
  *H04M 1/725*  (2006.01)
  *H01R 13/625*  (2006.01)
  *B60R 11/00*  (2006.01)
  *H04M 1/04*  (2006.01)

(52) U.S. Cl.
  CPC ............. *B60R 16/03* (2013.01); *B60R 11/0264* (2013.01); *H01R 13/625* (2013.01); *H04M 1/6075* (2013.01); *H04M 1/72533* (2013.01); *B60R 2011/0078* (2013.01); *H04M 1/04* (2013.01)

(58) Field of Classification Search
  CPC .................................................... Y02T 10/7005
  USPC ............................................................ 307/9.1
  See application file for complete search history.

(56) References Cited

U.S. PATENT DOCUMENTS

| 5,549,486 | A | 8/1996 | Cavallaro et al. |
| 7,190,817 | B1 * | 3/2007 | Schneider et al. ............ 382/126 |
| 7,456,777 | B2 | 11/2008 | Piekarz |
| 7,679,524 | B2 * | 3/2010 | Hofer et al. ................ 340/12.22 |
| 2009/0101766 | A1 | 4/2009 | Kalis et al. |

FOREIGN PATENT DOCUMENTS

DE    10 2005 033745 A1    2/2007
EP         1 473 913 A1    11/2004

* cited by examiner

*Primary Examiner* — Stephen W Jackson
(74) *Attorney, Agent, or Firm* — Haverstock & Owens LLP

(57) ABSTRACT

A remote control unit carries control keys and possesses in its back face a battery housing with central and peripheral power supply contacts, and also with signal transmission contacts. An active support carries a portion in relief suitable for penetrating into the housing of the unit to take the place of the power supply battery. Two power supply terminals are connected to a power supply line and arranged so as to bear against the respective power supply contacts of the unit when the portion in relief is inserted and locked in the housing of the unit, with the same applying for signal transmission terminals that are arranged on the portion in relief in positions that correspond to the transmission contacts of the unit.

10 Claims, 3 Drawing Sheets

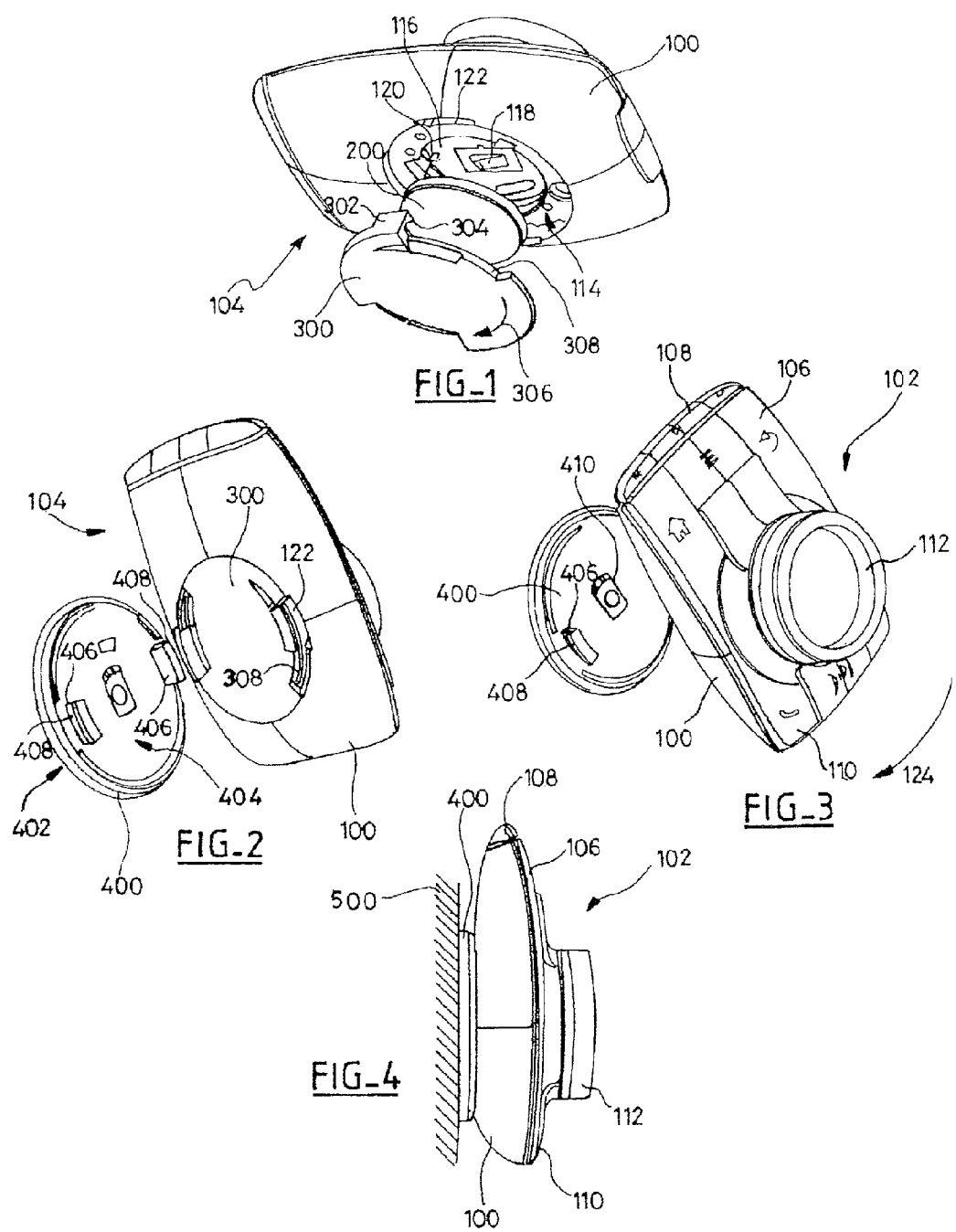

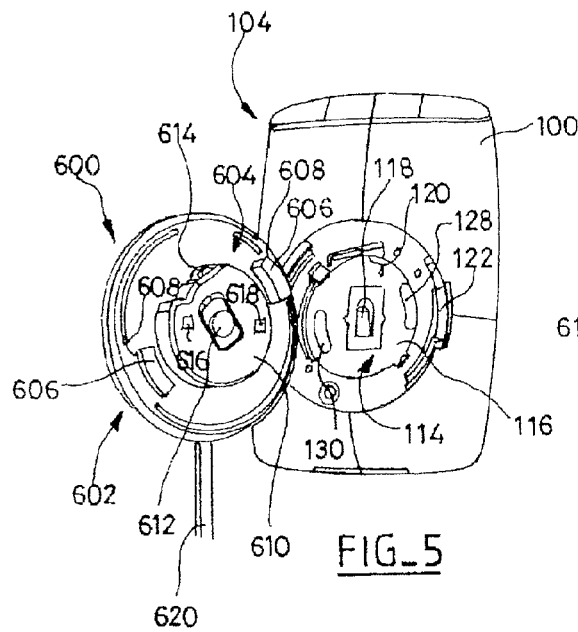
FIG_5
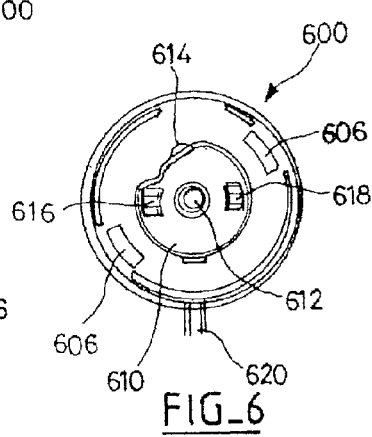
FIG_6
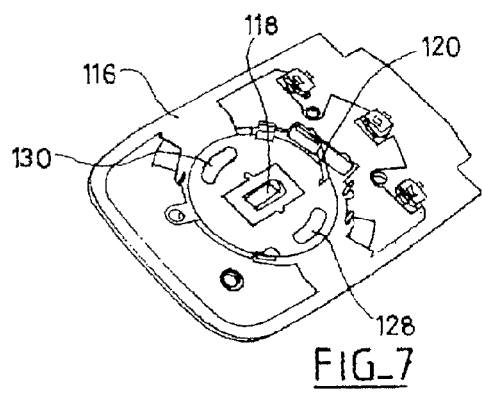
FIG_7
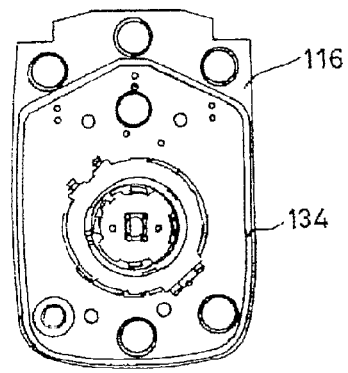
FIG_8
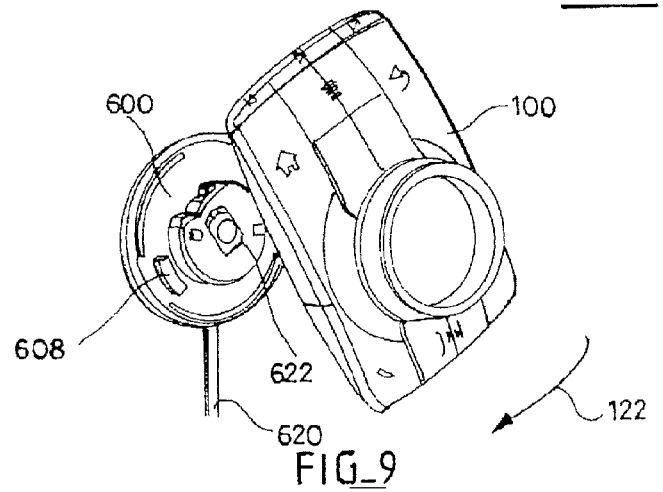
FIG_9

COMBINED WIRED AND WIRELESS REMOTE CONTROL FOR "HANDS-FREE" MULTIMEDIA AND TELEPHONY EQUIPMENT OF A MOTOR VEHICLE

FIELD OF THE INVENTION

The invention relates to a remote control assembly for "hands-free" multimedia and/or telephony equipment, in particular equipment incorporated in a motor vehicle.

BACKGROUND OF THE INVENTION

The equipment may be placed on the dashboard, but often at a location that is found to be too far away from the driver for the driver to be able to reach it easily without interfering with driving. That is why the equipment is associated with a remote control for facilitating access to the commands of the basic functions of the equipment. The equipment may also be placed in a location that is normally inaccessible to the driver, for example in the glove box of the vehicle.

For equipment that is "retrofitted" to a vehicle, the use of a wireless remote control that communicates with the equipment by means of radio-frequency (RF) waves is found to be particularly convenient to install and to use.

The wireless remote control can be held in the hand or else it may be fastened to a support that is stuck on the dashboard within reach of the driver. It may also be mounted on the steering wheel of the vehicle, e.g. as described in U.S. Pat. No. 7,456,777 B2.

The remote control does not require a wire connecting it to the equipment, and the user can place the remote control support very simply at a desired location, e.g. on the dashboard, by means of an adhesive and without any need to lay wiring with the wires running behind the dashboard and without any other technical constraints for installation. The remote control may also be used while held in the hand, in particular by a passenger seeking to use the equipment.

Nevertheless, fully independent wireless use presents the drawback of needing to have recourse to a power supply battery, with it being necessary to husband its lifetime because of its small capacity due to its small size (a "button" battery). As a result, it is not possible to provide permanent backlighting of the keys on a wireless remote control, which is a drawback at night since it is not possible to see the location of the remote control and its keys in the dark. Finally, if the battery is exhausted, it becomes impossible to use the equipment until the battery has been changed, which assumes that a spare battery is always available if it is desired for the equipment to be usable under all circumstances.

OBJECT AND SUMMARY OF THE INVENTION

The object of the invention is to solve those problems by proposing a novel remote control arrangement that is capable of operating equally well in a wireless mode and in a wired mode, with the choice of mode being left to the assessment of the user or of the installer:

in wireless mode, the remote control is powered by a conventional button-battery, with commands being transmitted via an RF antenna. Under such circumstances, the remote control can be used in a "roaming" manner, i.e. the remote control unit is not fastened to the dashboard; and in wired mode, the power supply, and advantageously the transmission of commands as well, all takes place via a wired connection to the equipment. In this mode, since the power supply comes from the on-board network of the vehicle, it can power not only the remote control circuits, but also backlighting of the keys, thus enabling the equipment to be operated under all circumstances, even at night.

The idea on which the invention is based consists in using the same battery power supply contacts, both for receiving a battery and for connecting to a power supply support, thus ensuring that connection means are minimized.

Essentially, the remote control assembly of the invention comprises a remote control unit with a battery housing that is capable of cooperating equally well either with a cover or else with an active support inserted in the housing:

the cover is for independent use of the remote control in association with a power supply battery (held in place by the cover) and with commands being sent via an RF channel; and the active support is for use in a wired mode without a power supply battery and includes a projection for inserting in the housing, the projection having terminals that take the place of the battery and that co-operate with the power supply contacts of the unit. The active support may advantageously also be provided with terminals for transmitting commands by wire, in which case RF transmission is deactivated. The active support may also act as a physical support for holding the remote control on the dashboard, thereby giving the assembly an advantageous aspect in terms of style, without overloading its design, and while conserving good ergonomics.

More precisely, the invention provides an assembly comprising, in a manner that is already known from the disclosure of the above-mentioned U.S. Pat. No. 7,456,777 B2, a remote control unit comprising a visible face carrying control keys and/or buttons, a back face with a housing for a power supply battery, and radio-frequency transmitter means for wirelessly transmitting control signals to the remote equipment; and a removable cover separable from the unit and suitable for closing the housing and holding in place a power supply battery placed in the housing.

In a manner characteristic of the invention, the following are provided inside the housing of the remote control unit: a central power supply contact and a peripheral power supply contact suitable for pressing against respective poles of the power supply battery inserted in the housing; and signal transmission contacts located on the bottom of the housing for transmitting control signals by wire to the remote equipment.

The assembly further comprises: on a back face, fastener means for fastening to the dashboard of the vehicle; on a front face, securing means for securing to the back face of the unit, and also a portion in relief suitable for penetrating into the housing in the unit to take the place of the power supply battery in the absence of the removable cover; an electrical power supply line suitable for being connected to the on-board network of the vehicle; a transmission line suitable for being connected to the remote equipment; two power supply terminals connected to the power supply line and arranged on the portion in relief in a central position and in a peripheral position in such a manner as to press against the central and peripheral contacts respectively of the unit when the portion in relief is inserted and locked in the housing of the unit; and signal transmission terminals placed on the portion in relief in positions corresponding to the transmission contacts of the unit when the portion in relief is inserted and locked in the housing of the unit.

According to various advantageous subsidiary characteristics:

the signal transmission contacts comprise a diametrically opposite pair of contacts in the form of circular arcs, and the control signals are transmitted by wire to the remote equipment by asynchronous serial transmission;

the remote control unit incorporates detector means for detecting an established connection on the signal transmission contacts, and means for deactivating the radio-frequency transmitter means on detecting said connection;

the remote control unit incorporates backlighting means for backlighting the control keys and/or buttons, detector means for detecting an established connection on the power supply contacts with the on-board network of the vehicle, and means for activating the backlighting means on detecting said connection;

the means for locking the cover to the unit are bayonet fastener means suitable for enabling the cover to be put into place on the unit in an angularly offset position, and then enabling it to be locked by being turned through a fraction of a turn to a final, utilization position;

the securing means for securing the active support to the unit are bayonet fastener means suitable for enabling the unit to be put into place on the active support in an angularly offset position, and then enabling it to be locked by being turned through a fraction of the turn to a final, utilization position;

the assembly further comprises a passive support comprising on its back face, fastener means for fastening to the dashboard of the vehicle, and on its front face, securing means for securing to the back face of the unit provided with the power supply battery and the removable cover; and said securing means comprise hooks suitable for reversibly co-operating with corresponding recesses formed in the removable cover and/or in the back face of the unit.

Most advantageously, the securing means for securing the passive support, and the securing means for securing the active support to the back face of the unit each comprise respective hooks suitable for co-operating with the same recesses of the unit. These means are advantageously configured in such a manner as to enable the unit to be put into place on the plate in an angularly offset position and then locked by being turned through a fraction of a turn to a final, holding position.

BRIEF DESCRIPTION OF THE DRAWINGS

There follows a description of an embodiment of the device of the invention given with reference to the accompanying drawings in which the same numerical references are used from one figure to another to designate elements that are identical or functionally similar.

FIG. 1 is an exploded rear perspective view showing the remote control of the invention in a wireless configuration, with its power supply battery and the removable cover.

FIGS. 2, 3, and 4 are views from various angles showing the way in which the FIG. 1 remote control is associated with a passive support for holding it on the dashboard of the vehicle.

FIG. 5 is a rear perspective view showing the remote control and an active support enabling it to operate in a wired mode.

FIG. 6 is a face view of the FIG. 5 active support, shown in isolation.

FIGS. 7 and 8 show the elements on the front face and on the back face of the internal printed circuit of the remote control unit, with the various contacts used for operation in wired mode.

FIG. 9 is a perspective view showing the way in which the remote control should be presented facing the active support in order to couple the remote control unit to the support.

MORE DETAILED DESCRIPTION

Figure 10:
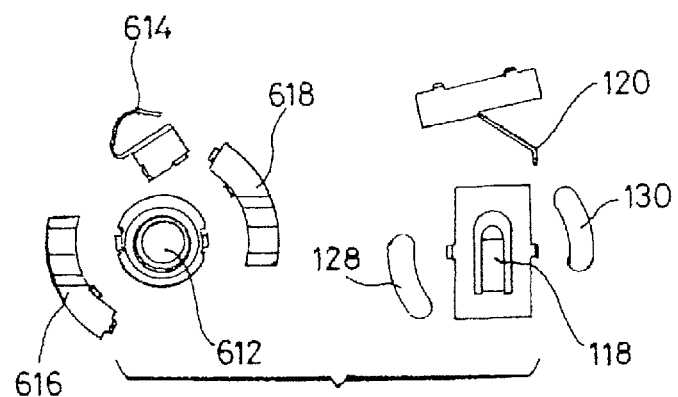
FIG. 10 shows, in isolation and facing each other, the power supply and signal transmission terminals of the active support, together with the power supply and signal transmission contacts of the remote control unit.

In the figures, there can be seen the remote control assembly of the invention, which assembly includes a remote control unit 100. The unit is for controlling "hands-free" multimedia and telephony equipment suitable for enabling the driver of a motor vehicle to send or receive a telephone call without the hands leaving the steering wheel, and in the same manner for enabling the driver to start and stop the playback of a music source, to increase or decrease the volume of reproduction, to switch to the previous or the following piece of music, etc.

The unit 100 comprises a body having a visible face 102 and a back face 104. The visible face carries various remote-control pushbuttons 106, 108, 110 . . . and a clickable rotary wheel 112 for functions such as volume control, scrolling through a menu, etc.

The back face 104 presents an opening 114 forming a housing that is to receive, in particular, a button type power supply battery 200. The battery housing 114 reveals the printed circuit 116 of the remote control, which circuit carries a central power supply contact 118 and a peripheral power supply contract 120 in the form of spring blades that are to press against respective poles of the power supply battery 200.

These power supply contacts 118, 120 are visible in detail in FIG. 7, which shows, in isolation, the face of the printed circuit 116 that is visible through the battery housing 114. Furthermore, in FIG. 8, the reference 134 designates the RF antenna used for wireless transmission of signals to the remote equipment, this antenna being implemented in the form of a conductive track on the back face of the printed circuit 116.

In order to hold the battery 200 in place in the housing 114, a removable cover 300 closes the battery housing. The cover 300 includes locking means such as tabs 302 terminated by lugs 304 that co-operate with complementary elements 122 of the unit 100 formed at the periphery of the battery housing 114 so as to enable the housing to be closed and the battery to be locked in position by turning the cover through a fraction of a turn 306.

Fitted in this way, the remote control 100 constitutes an article that is fully self-contained and suitable for controlling the remote equipment wirelessly.

Advantageously, a passive support 400 is provided for holding the remote control 100 in place on the dashboard 500 of the vehicle (FIG. 4).

More precisely, and as shown in FIGS. 2 and 3, this passive device 400 has a back face 402 provided with an adhesive disk suitable for being stuck to the dashboard, and a front face 404 including means for securing to the back face 104 of the remote control unit closed by the cover 300. By way of example, these holding means are projections 406 terminated by diametrically-opposite locking hooks 408 that are inserted into corresponding openings in the unit-and-cover assembly, more precisely into respective wider openings 122 of the unit enabling the hooks 408 to be inserted, and into respective narrower openings 308 of the cover 300 for providing locking to the passive support 400 after being turned through a fraction of a turn (arrow 124, FIG. 3). A mark 410 on the support 400 shows the user the angle of inclination to be given to the unit 100 so that the hooks 408 can penetrate appropriately into the openings 122 before beginning turning 124. As can be seen in FIG. 4, after the remote control 100 has been assembled on the passive support 400, the assembly remains very thin and the various control keys of the visible face 102 of the remote control remain completely accessible.

With reference to FIGS. 5 to 12, there follows a description of the way in which this remote control is used, not in a "wireless" mode, but rather in a wired mode.

Wired mode presents the advantage of enabling energy to be supplied to the remote control directly from the on-board network of the vehicle. The problem of the operating lifetime of the button battery disappears, and it also becomes possible to backlight the various buttons of the visible face of the remote control in order to make it more convenient to use, in particular at night.

This mode of utilization makes use of an active support 600 that is in the form of a flat disk with a back face 602 carrying an adhesive element enabling the disk to be stuck to the dashboard 500, and a front face 604 for co-operating with the back face 104 of the unit 100.

More precisely, the front face 604 carries diametrically opposite projections 606, e.g. terminated by locking hooks 608 suitable for co-operating with the notches 122 of the unit 100 after the removable cover and the power supply battery have been removed, i.e. in a configuration in which the cavity 114 for housing the battery is visible. The front face 604 of the active support 600 also carries a projection or portion in relief 610 presenting substantially the same shape and dimensions as a button battery and designed to penetrate into the battery housing 114. This portion in relief 610 carries a terminal 612 suitable for pressing against the central power supply contact 118 of the remote control, and a peripheral terminal 614 in the form of a flexible blade suitable for bearing against the peripheral power supply contact 120 of the unit 100.

The active support 600 also carries two diametrically opposite terminals 616, 618 for signal transmission, which terminals are designed to co-operate with corresponding contacts 128, 130 formed on the printed circuit 116 of the remote control unit 120, these contacts being visible when the battery housing 114 is open and the battery has been removed. The contacts 128, 130 may be constituted in particular by conductive tracks formed on the printed circuit 116 over a fraction of an arc of a circle.

The active support 600 also includes a line 620 for electrical power supply and data transmission, this line connecting the power supply terminals 612, 614 and the signal transmission terminals 616, 618 to the remote equipment. The transmission of commands does not require data to be transmitted at a very high rate, and may be implemented as a synchronous serial transmission of the universal asynchronous receiver-transmitter (UART) type, which requires only two conductors.

The active support 600 is permanently installed on the dashboard of the vehicle and it is connected to the equipment via the line 620 by the installer.

The remote control unit 100 is mounted on the active support 600 in the manner shown in FIG. 9, by turning the unit 100 through a fraction of a turn (arrow 132). A mark 622 on the support 600 shows the user the angle of inclination to give to the unit 100 so that the hooks 608 can penetrate appropriately into the corresponding openings in the unit before beginning to turn. In the end, after the remote control 100 has been mounted on the active support 600, the assembly conserves thickness that is very small and the various control keys on the visible face of the remote control remain completely accessible.

Once the remote control 100 has been put into place and locked on the active support 600, this configuration can be detected automatically by the unit, which then deactivates its RF communications functions and activates wired transmission of commands to the equipment and also activates the backlighting of the various control keys.

The characteristic of the active support 600 is to enable the same contacts in the unit (the central contact 118 and the peripheral contact 120) to be used both:

in wireless mode to co-operate with the battery when it is in position in the housing 114 and held in place by the removable cover 300 (configuration of FIG. 1); and in wired mode when, after the battery has been removed together with the removable cover, the unit 100 is locked on the active support 600 (configuration of FIGS. 5 to 12).

It can be understood that in wired mode, the active support 600 also serves as a mechanical support for the remote control on the dashboard.

Figure 11:
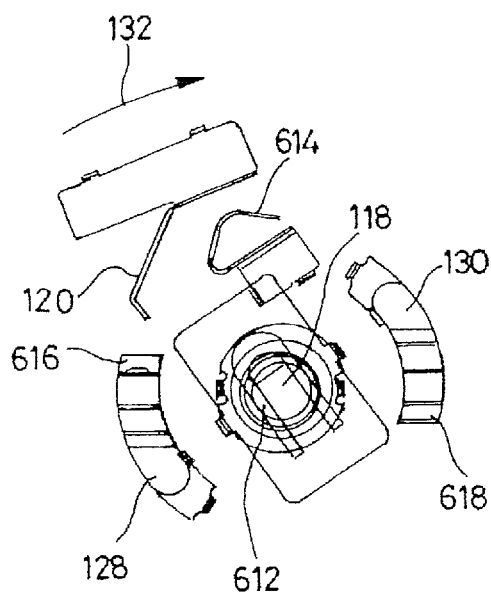
FIGS. 11 and 12 show the terminals and the contacts of FIG. 10 in superposed manner, respectively in the initial position in which the remote control is presented facing the active support of FIG. 9, and in the working, final position in which the unit is locked to the support.
Figure 12:
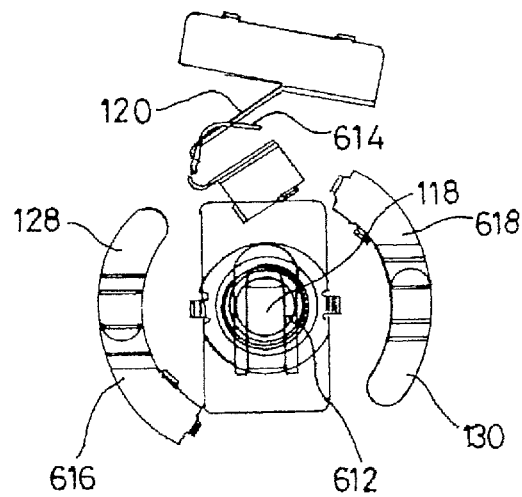

FIGS. 10 to 12 show:

FIG. 10, the power supply terminals 612, 614 and the signal transmission terminals 616, 618 of the active support together with the power supply contacts 118, 120 and the signal transmission contacts 128, 130 of the remote control unit, these various elements being considered in isolation and shown facing one another; and FIGS. 11 and 12 show the terminals 612, 614 and 616, 618 and the contacts 118, 120 and 128, 130 of FIG. 10 in superposed manner, respectively in the initial position for presenting the remote control facing the active support of FIG. 9, and in the final, working position in which the unit is locked to the support.

The power supply terminals at 612, 614 and the signal transmission terminals 616, 618 of the active support are stationary, while the power supply contacts 118, 120 and the signal transmission contacts 128, 130 of the remote control unit move during the turning (arrow 132) corresponding to mechanically putting the remote control unit 100 into place on the active support 600. FIG. 11 corresponds to the configuration of FIG. 9, and FIG. 12 corresponds to the configuration of the same elements after being turned through a fraction of a turn, corresponding to locking the unit on the active support: in this position, coupling is established between the following contacts and terminals: 118/612, 120/614 for electrical power supply, 128/616 and 130/618 for transmitting commands by wire. Furthermore, as can be seen, the power supply contacts 118, 120 and the signal transmission contacts 128, 130 of the unit, and also the power supply terminals 612, 614 and the signal transmission terminals 616, 618 of the active support 600 are geometrically configured in such a manner as to avoid any mutual interference while the unit is being coupled with the active support.

What is claimed is:

1. An assembly for remotely controlling "hands-free" multimedia and/or telephony equipment incorporated in a motor vehicle, the assembly comprising:

a) a remote control unit comprising:
   a visible face carrying control keys and/or buttons;
   a back face with a housing for a power supply battery; and
   radio-frequency transmitter means for wirelessly transmitting control signals to the remote equipment; and
b) a removable cover separable from the unit and suitable for closing the housing and holding in place a power supply battery placed in the housing;
wherein the following are provided inside the housing of the remote control unit:
   a central power supply contact and a peripheral power supply contact suitable for pressing against respective poles of the power supply battery inserted in the housing; and
   signal transmission contacts located on the bottom of the housing for transmitting control signals by wire to the remote equipment; and
wherein it further comprises:
c) an active support comprising:
   on a back face, fastener means for fastening to the dashboard of the vehicle;
   on a front face, securing means for securing to the back face of the unit, and also a portion in relief suitable for penetrating into the housing in the unit to take the place of the power supply battery in the absence of the removable cover;
   an electrical power supply line suitable for being connected to the on-board network of the vehicle;
   a transmission line suitable for being connected to the remote equipment;
   two power supply terminals connected to the power supply line and arranged on the portion in relief in a central position and in a peripheral position in such a manner as to press against the central and peripheral contacts respectively of the unit when the portion in relief is inserted and locked in the housing of the unit; and
   signal transmission terminals placed on the portion in relief in positions corresponding to the transmission contacts of the unit when the portion in relief is inserted and locked in the housing of the unit.

2. The assembly of claim 1, wherein the signal transmission contacts comprise a diametrically opposite pair of contacts in the form of circular arcs, and wherein the control signals are transmitted by wire to the remote equipment by asynchronous serial transmission.

3. The assembly of claim 1, wherein the remote control unit incorporates:
   detector means for detecting an established connection on the signal transmission contacts; and
   means for deactivating the radio-frequency transmitter means on detecting said connection.

4. The assembly of claim 1, wherein the remote control unit incorporates:
   backlighting means for backlighting the control keys and/or buttons;
   detector means for detecting an established connection on the power supply contacts with the on-board network of the vehicle; and
   means for activating the backlighting means on detecting said connection.

5. The assembly of claim 1, wherein the means for locking the cover to the unit are bayonet fastener means suitable for enabling the cover to be put into place on the unit in an angularly offset position, and then enabling it to be locked by being turned through a fraction of a turn to a final, utilization position.

6. The assembly of claim 1, wherein the securing means for securing the active support to the unit are bayonet fastener means suitable for enabling the unit to be put into place on the active support in an angularly offset position, and then enabling it to be locked by being turned through a fraction of the turn to a final, utilization position.

7. The assembly of claim 1, further comprising:
d) a passive support comprising:
   on its back face, fastener means for fastening to the dashboard of the vehicle; and
   on its front face, securing means for securing to the back face of the unit provided with the power supply battery and the removable cover.

8. The assembly of claim 7, wherein said securing means comprise hooks suitable for reversibly co-operating with corresponding recesses formed in the removable cover and/or in the back face of the unit.

9. The assembly of claim 8, wherein the securing means for securing the passive support, and the securing means for securing the active support to the back face of the unit each comprise respective hooks suitable for co-operating with the same recesses of the unit.

10. The assembly of claim 8, wherein the hooks and the corresponding recesses are configured in such a manner as to enable the unit to be put into place on the plate in an angularly offset position and then locked by being turned through a fraction of a turn to a final, holding position.

* * * * *